United States Patent [19]

Vincent

[11] Patent Number: 4,608,306
[45] Date of Patent: Aug. 26, 1986

[54] ANTI-TREEING ADDITIVES CONTAINING A POLYOLEFIN AND A SILOXANE HAVING AROMATIC ORGANIC GROUPS

[75] Inventor: Gary A. Vincent, Midland, Mich.

[73] Assignee: Dow Corning Corporation, Midland, Mich.

[21] Appl. No.: 622,044

[22] Filed: Jun. 19, 1984

Related U.S. Application Data

[63] Continuation-in-part of Ser. No. 483,357, Apr. 8, 1983, abandoned.

[51] Int. Cl.$^4$ .................. C08L 23/08; B32B 25/20
[52] U.S. Cl. .................. 428/391; 428/390; 524/265; 524/269; 525/106
[58] Field of Search ............ 524/265, 269; 525/106; 428/391, 390

[56] References Cited

U.S. PATENT DOCUMENTS

| 2,645,624 | 7/1953 | Hunter | 524/265 |
| 3,956,420 | 5/1976 | Kato et al. | 524/269 |
| 4,289,859 | 9/1981 | Kalinowski | 524/269 |
| 4,400,429 | 8/1983 | Barlow et al. | 524/265 |

FOREIGN PATENT DOCUMENTS

| 2933247 | 3/1980 | Fed. Rep. of Germany | 524/265 |
| 56-109404 | 8/1981 | Japan | 524/269 |

Primary Examiner—Wilbert J. Briggs, Sr.
Attorney, Agent, or Firm—Robert L. McKellar

[57] ABSTRACT

A composition comprising a polyolefin and an additive selected from cyclic siloxanes containing at least one aromatic group attached to silicon; linear siloxanes containing at least one aromatic group and a silanol content greater than 0.4 weight percent, and linear siloxanes containing at least one aromatic group and having a functional group convertible to a silanol content of greater than 0.4 weight percent by ambient hydrolysis conditions.

10 Claims, 19 Drawing Figures

FIG. 18. LN MILS TREE GROWTH GRAPH I

FIG. 19. LN MILS TREE GROWTH GRAPH J tion # ANTI-TREEING ADDITIVES CONTAINING A POLYOLEFIN AND A SILOXANE HAVING AROMATIC ORGANIC GROUPS

FIELD OF THE INVENTION

This application is a continuation-in-part application of U.S. application Ser. No. 483,357, filed Apr. 8, 1983, now abandoned.

This invention relates to a composition comprising a polyolefin and a siloxane having at least one silicon bonded aromatic group to prevent treeing in the polyethylene.

This invention further relates to an electrical cable comprising a primary insulating layer manufactured from the polyethylene and the siloxane additive.

DESCRIPTION OF THE PRIOR ART

Polymeric compositions are well-known and are used extensively as primary insulation materials for wire and cable. As an insulator, it is important the composition have various physical and electrical properties, such as resistance to mechanical cut through; stress crack resistance; and dielectric failure. Recent publications have indicated water tree growth and electrical tree growth in the primary insulation are particularly important problems since they are associated with, though not necessarily totally responsible for, dielectric failure.

An important application for a primary insulating material is in high voltage transmission and distribution cable, especially useful in direct buried underground service. Unfortunately, the efficient use of polymeric compositions in high voltage cables is precluded by a degradation process called "treeing". Treeing is an electrical pre-breakdown process. The name is given to the damage in a solid dielectric exposed to electrical stress wherein the damage visually resembles trees. Treeing can occur and progress as a result of partial discharges or without discharges in the presence of moisture, and with impulse, ac, or dc voltages.

It is generally believed two different types of trees exist. Trees which form in the presence of water, and in particular at low voltages, are called water or electrochemical trees. When water is absent, the trees which form are called electrical trees.

Although there are many theories concerning the initiation and growth of trees, there is virtual unanimity in the belief they start at an imperfection in the cable. This imperfection can be a small void or a piece of solid contamination.

Several organic additives have been discovered which are quite effective in retarding the growth of both types of trees. Acetophenone is perhaps one of the best known anti-treeing agents in existence. It is a product of the decomposition of dicumylperoxide which has found wide use as a curing agent to produce crosslinked polyethylene. The initial decreased treeing tendency of crosslinked polyethylene is a direct result of the existence of acetophenone in the former. Unfortunately, the effect is only temporary because the acetophenone diffuses out of the polyethylene with time; and the polymer's resistance to treeing becomes essentially the same as uncrosslinked polyethylene.

The prevention of treeing has also been attempted by preparing super clean resin. The inclusion of fillers or decreasing or eliminating the cable's exposure to steam during crosslinking is also helpful.

Silicones have found limited use in the area of antitreeing. Kato, et al. (U.S. Pat. No. 3,956,420) discloses the use of a combination of ferrocene, an 8-substituted quinoline, and a silicone liquid to increase the dielectric strength of polyethylene and its voltage endurance in water. Ashcraft, et al. (U.S. Pat. No. 4,144,202) inhibits water treeing in ethylene polymer compositions by employing organosilanes containing an epoxy radical. Ashcraft, et al. (U.S. Pat. No. 4,263,158) further discloses the use of organosilanes containing C=N bonds to inhibit water treeing in ethylene polymers. Ashcraft et al. (Canadian Pat. No. 1,103,915) further discloses the use of organosilanes containing C=O bonds to inhibit water treeing in ethylene polymers.

German Offenlegungsschrift No. 2,737,430 and U.S. Pat. No. 4,299,713 disclose the addition of alkoxysilanes to polyolefin insulation to prevent water tree formation. U.S. Pat. No. 4,332,957 discloses the use of phenoxyalkoxy-substituted silanes as water tree and electrical tree retardant additives. British Pat. No. 1,248,256, and British Pat. No. 1,277,378 disclose treating mineral fillers with organosilanes and then adding them to the polymer to decrease the porosity of the composition. Japanese Patent No. Sho 50[1981]-92946 discloses the use of silicon grafted polyolefins in combination with propionates to inhibit water treeing. Japanese Patent No. Sho 56[1981]-109404 discloses the use of diorganopolysiloxanes having a viscosity range of 30 to 500 centistokes to inhibit water treeing. This patent further discloses siloxanes modified with alkoxy groups have little effect upon water treeing.

As is evidenced by the prior art, treeing can be inhibited in two different ways. If the voids in the plastic are filled, there is slight improvement in resistance to treeing. If voltage stabilizers, such as acetophenone, are included in the polyethylene, the stabilizers are thought to trap and deactivate electrons, and thus inhibit treeing. Most, if not all, of the voltage stabilizers are mobile aromatic compounds. The mobility of the compound, however, can not be so great that it does not stay in the plastic. If the additive is too mobile and low in molecular weight, it migrates to the surface, it evaporates, and its effectiveness is totally lost.

As evidenced by the data in the present application, it is theorized that the ideal composition should contain an additive which is mobile and sufficiently compatible (soluble) with the plastic so it can migrate to the voids and solid impurities which are the points of treeing initiation. By filling and surrounding these faults in the plastic, it retards the initiation of the trees; and by filling the tree channel as it is formed, it retards the growth of the trees. At the same time, the additive must be sufficiently nonvolatile to assure it stays in the plastic and does not evaporate.

It is thus an object of this invention to provide a composition comprising a polyolefin and a siloxane; the siloxane being mobile, nonvolatile, and somewhat compatible (soluble) with the plastic. It is a further object of this invention to provide a cable which is manufactured from the compositions of this invention.

DETAILED DESCRIPTION

This invention relates to a composition comprising a polyolefin and a siloxane. Thus, this invention relates to a composition comprising a polyolefin and 1.0 to 5.0 weight percent, based on the total weight of the polyolefin, of an additive selected from (i) cyclic siloxanes containing at least one aromatic group attached to silicon through a silicon-carbon bond; (ii) linear siloxanes containing at least one aromatic group attached to silicon through a silicon-carbon bond and having a silanol content of greater than 0.4 weight percent, and (iii) linear siloxanes containing at least one aromatic group attached to silicon through a silicon-carbon bond and having a functional group content, which is directly convertible by hydrolysis under ambient conditions to a silanol content of greater than 0.4 weight percent.

This invention further relates to an electrical wire or cable which has been manufactured by using the composition of this invention as a primary insulating layer.

In general, the polymeric component of the present invention can be any solid synthetic organic polymeric resin including polyolefins and copolymers thereof.

The polyolefins include solid polymers of olefins, particularly mono-alpha-olefins, which comprise from about two to about six carbon atoms, e.g., polyethylene, polypropylene, polybutene, polyisobutylene, poly(4-methyl pentane), and the like. Copolymers of ethylene, and other compounds interpolymerizable with ethylene such as butene-1, pentene-1, styrene, and the like, may be employed. In general, the copolymer will be comprised of 50 percent by weight or more of ethylene.

Suitable examples of olefin-vinyl copolymers include ethylene-vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, and the like. In general, the ethylene constitutes at least 25 percent by weight of the copolymer.

Specific examples of suitable olefin-allyl copolymers include ethylene-allyl benzene, ethylene-allyl ether, and ethylene-acrolein.

It is preferred, however, that the polymer be a polyolefin, with polyethylene being most preferred.

As far as is known at this time, the siloxane can be any siloxane as long as it has at least one aromatic group bonded to silicon through a silicon-carbon bond and fits the general limits of (i), (ii) and (iii), below.

(i) are cyclic siloxanes which contain at least one aromatic group attached to silicon through a silicon-carbon bond and is at least a trimer siloxane. Preferred from (i) are cyclic siloxanes having 3, 4, 5 and 6 siloxane groups. Most preferred from (i) are cyclic siloxanes having such siloxane groups which contain phenyl and methyl attached silicon. Examples of these cyclics are $\{C_6H_5(CH_3)SiO\}_x$ wherein x has a value of 3, 4, 5, 6 or a mixture of such cyclic siloxanes.

(ii) are linear siloxanes containing at least one aromatic group attached to silicon through a silicon-carbon bond and which have from 2 to 36 siloxane units and have a silanol content of at least 0.4 weight percent. Preferred from (ii) are siloxanes having from 2 to 10 siloxane units. Most preferred from (ii) are siloxanes having from 2 to 10 siloxane units and having one phenyl and one methyl group attached to silicon. Thus, most preferred are those siloxanes having the general formula $HO\{C_6H_5(CH_3)SiO\}_xH$ wherein x has a value of from 2 to 10. These materials have a calculated silanol content of from 2.47 to 11.72 weight percent.

The third group (iii) are linear siloxanes containing at least one aromatic group attached to silicon through a silicon-carbon bond and having a functional group content which is directly convertible to a silanol content of greater than 0.4 weight percent, by hydrolysis of the functional group under ambient conditions. Thus, preferred for this invention from (iii) are siloxanes having the general formula $CH_3O(C_6H_5(CH_3)SiO)_xCH_3$ wherein x has a value of from 2 to 36. Most preferred from (iii) are siloxanes wherein x has a value of 2 to 10.

It is obvious that the best use of siloxanes (iii) are to add them to the polyethylene, hydrolyze them at ambient conditions, and remove any volatile by-products before the polyethylene is formed or extruded.

By hydrolysis under ambient conditions, it is meant those commonly accepted techniques of hydrolyzing alkoxy silanes, including the use of small amounts of acid to catalyze the hydrolysis at or near room temperature.

It is believed the aromatic group is necessary for mobility of the additive in the polymer.

So far as is known at this time, the aromatic character gives the siloxane the anti-treeing properties.

It is preferred, the other substituents on the siloxane be saturated unsubstituted hydrocarbon radicals, with alkyl being preferred and methyl being optimal.

It is further recommended the chain length of the siloxane be in the range of 2 to 36, with 2 to 10 being optimal.

As far as is known at this time, the order of mixing the components and the specific procedure employed is not critical for the purpose of this invention. The components may be mixed on a variety of apparatus including multi-roll mills, screw mills, continuous mixers, compounding extruders, and Banbury mixers.

The treeing resistance of the plastic is affected by the amount of additive present and the amount of silanol present if it is a linear siloxane. The amount of additive which would be used would be determined by at least three factors:

1. The level of tree resistance desired-normally this would be as high as possible.
2. The physical properties of the composition—Excessive silicone could result in a composition with insufficient integrity for the application. Excessive silicone could also adversely affect the molding process by causing slippage.
3. The economics of the composition—the more silicone that is used the more expensive the composition. Based on these factors, it is recommended the composition contain between 1 and 5 percent of the siloxane, with 1 to 3 percent preferred.

Minor amounts of other additives may also be employed in conventional amounts to obtain the desired results. Conventional antioxidants such as the hindered phenols, polyquinolines, and the like may be employed. Other ingredient which may be included are plasticizers, dyes, pigments, heat and light stabilizers, antistatic agents, and the like.

BRIEF DESCRIPTION OF THE DRAWINGS

The graphs I to IX are representations of data points that were graphed using a computer graphing routine. The data set denoted by X are the comparative base resins with no additives while the data set O are the base resins with additives of this invention.

Graph I compares compositions A and B.
Graph II compares compositions A and C.
Graph III compares compositions A and D.
Graph IV compares composition A and composition I.
Graph V compares composition A and composition F.
Graph VI compares compositions H and J.
Graph VII compares compositions H and L.

Graph VIII compares compositions H and K.
Graph IX compares compositions A and E.

Graphs A through J are graphic representations of the results of the water tree analysis on the samples. The data is presented as a plot of the natural log average true length versus the natural log of the test time. Graph A represents sample A; Graph B represents sample B and so on, through sample J.

Figure 1:
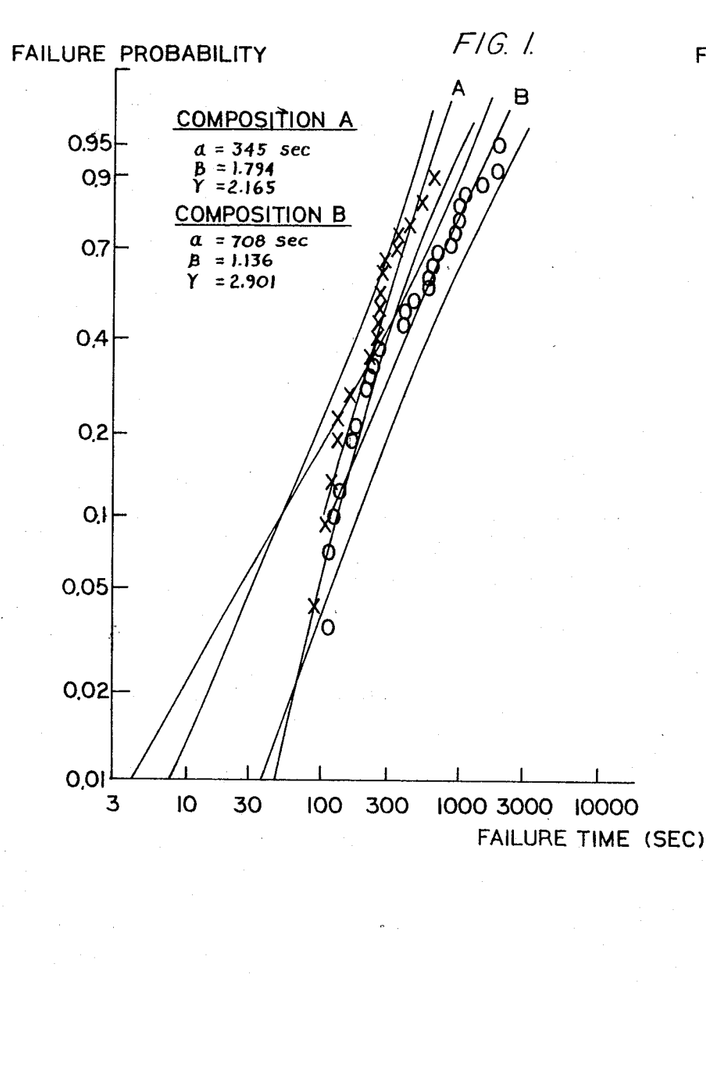
Figure 2:
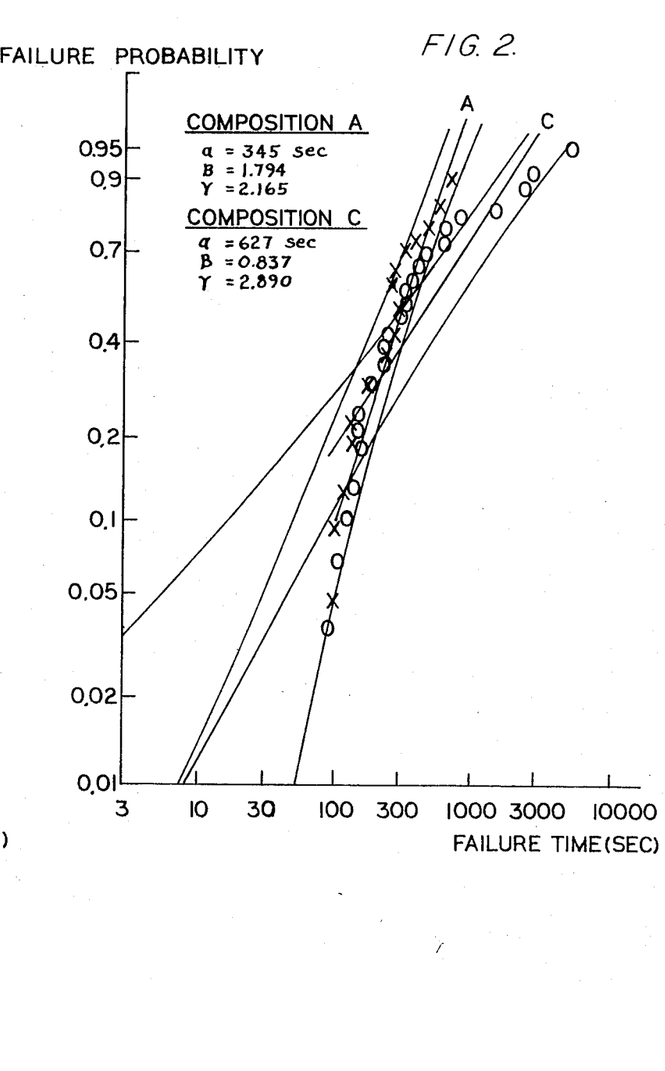
Figure 3:
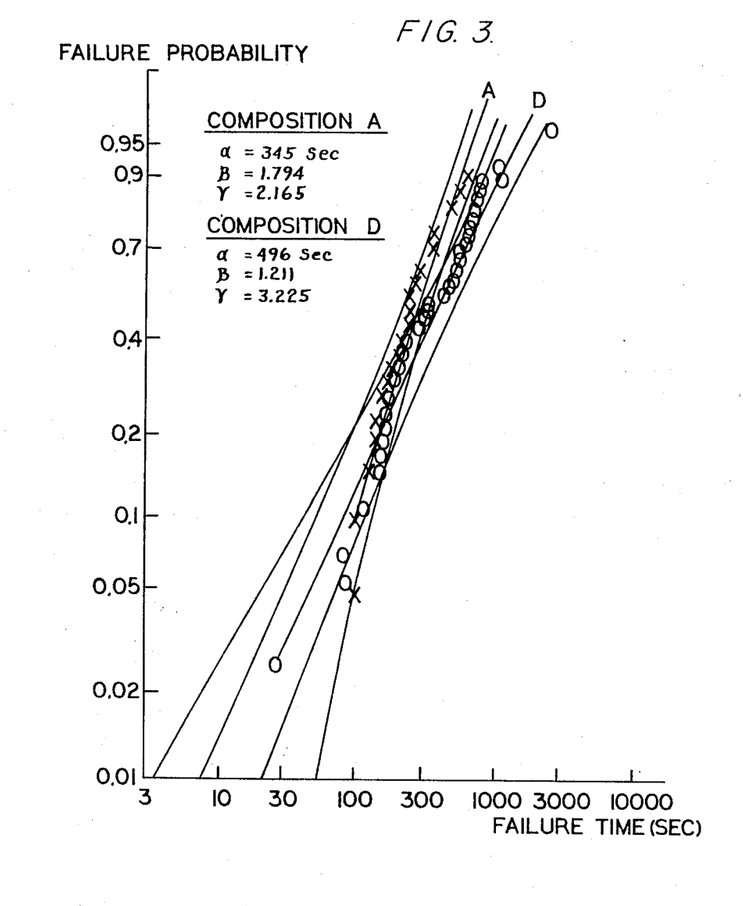
Figure 4:
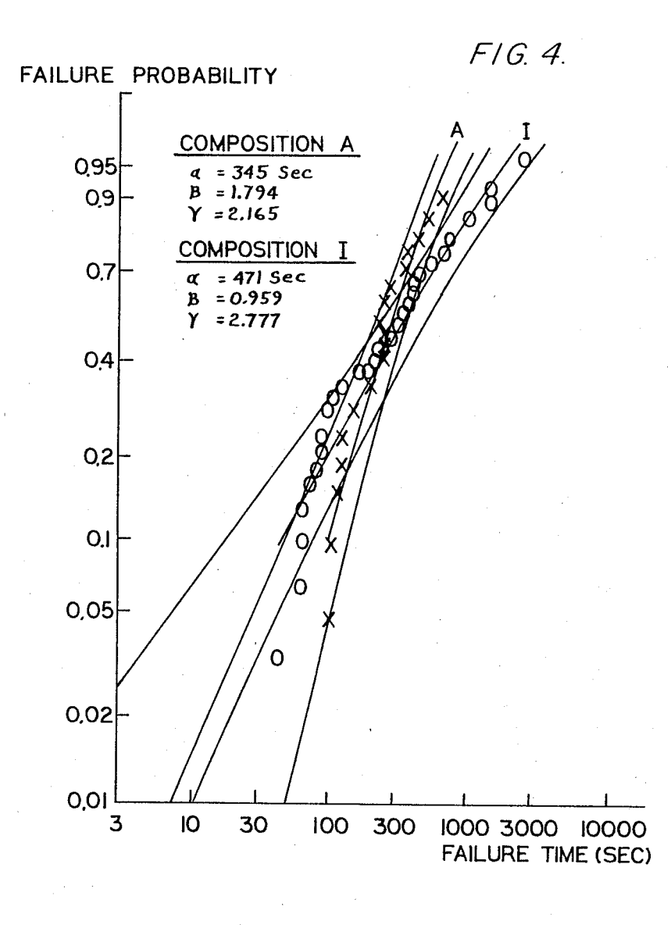
Figure 5:
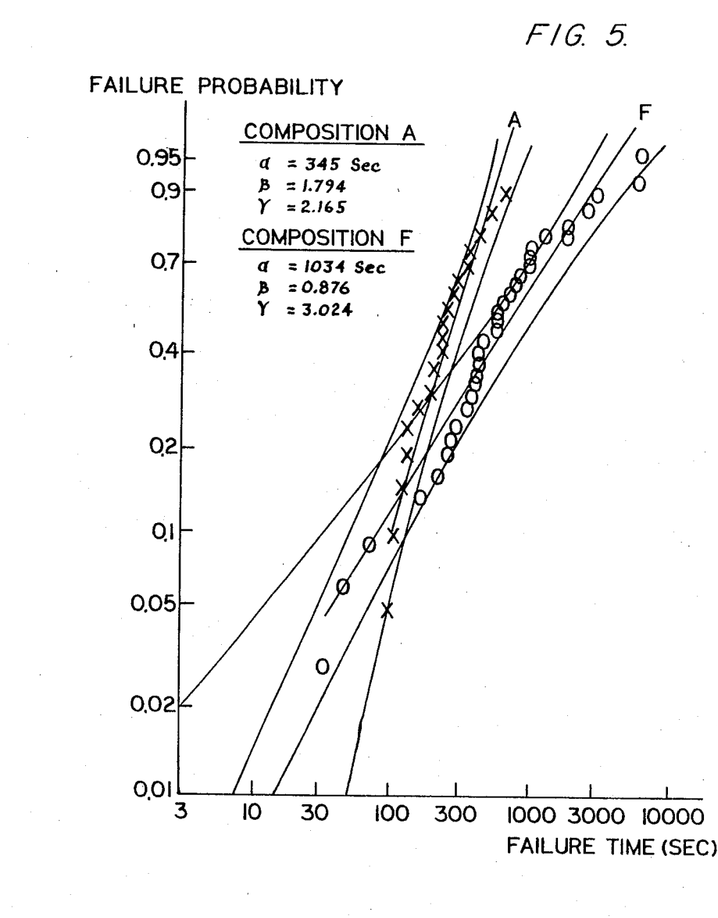
Figure 6:
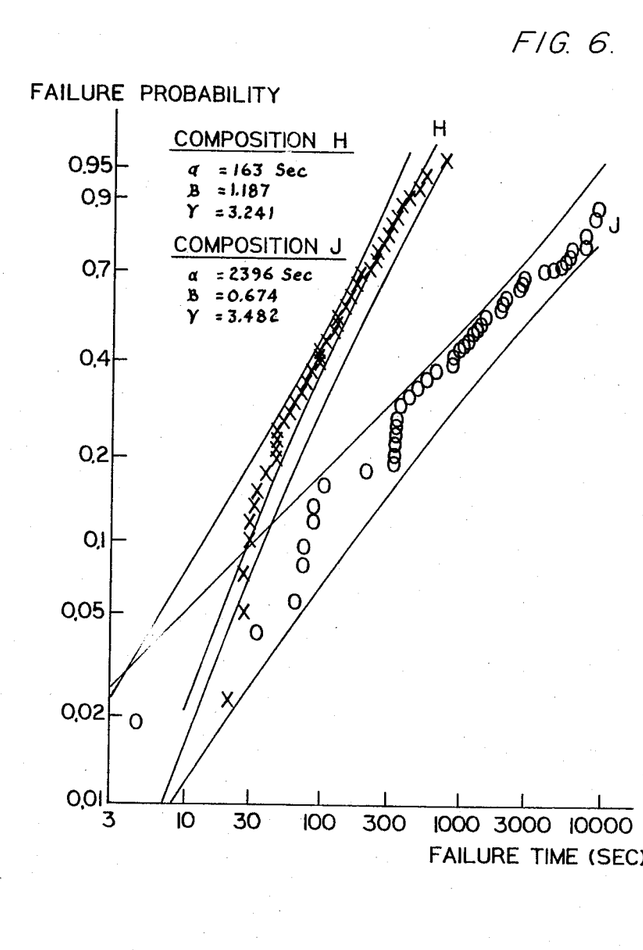
Figure 7:
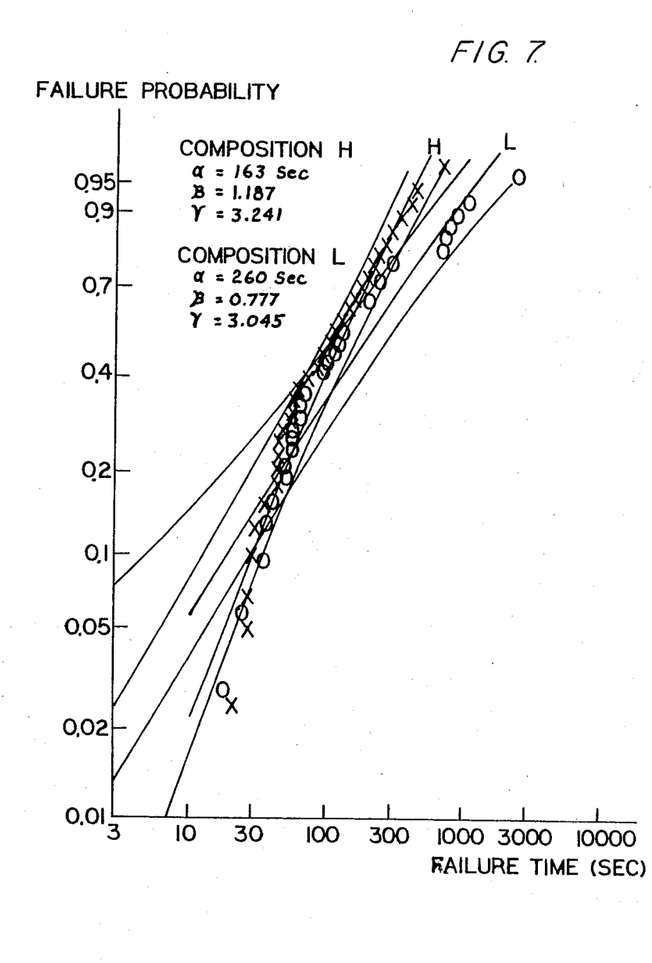
Figure 8:
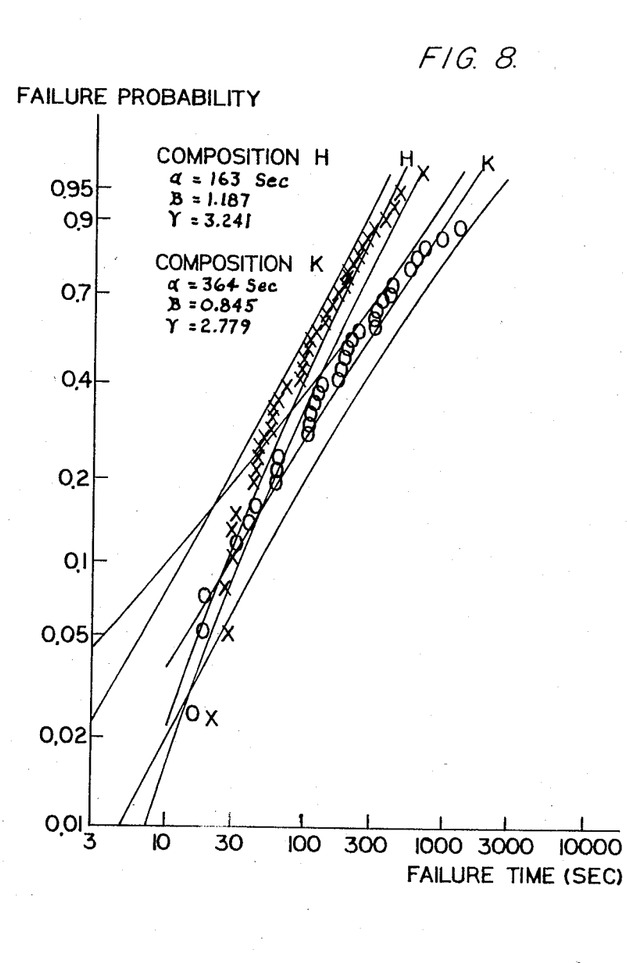
Figure 9:
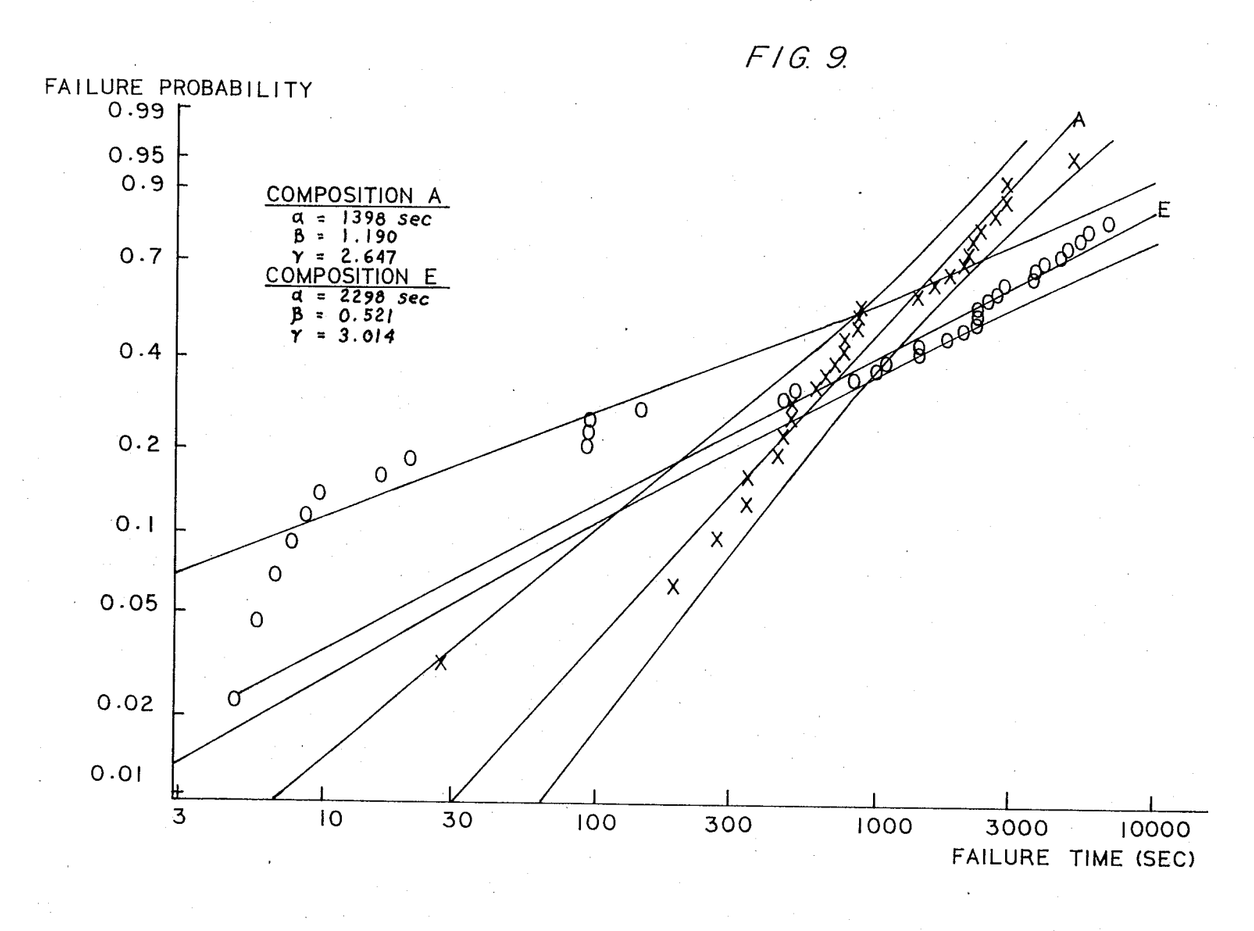
Figure 10:
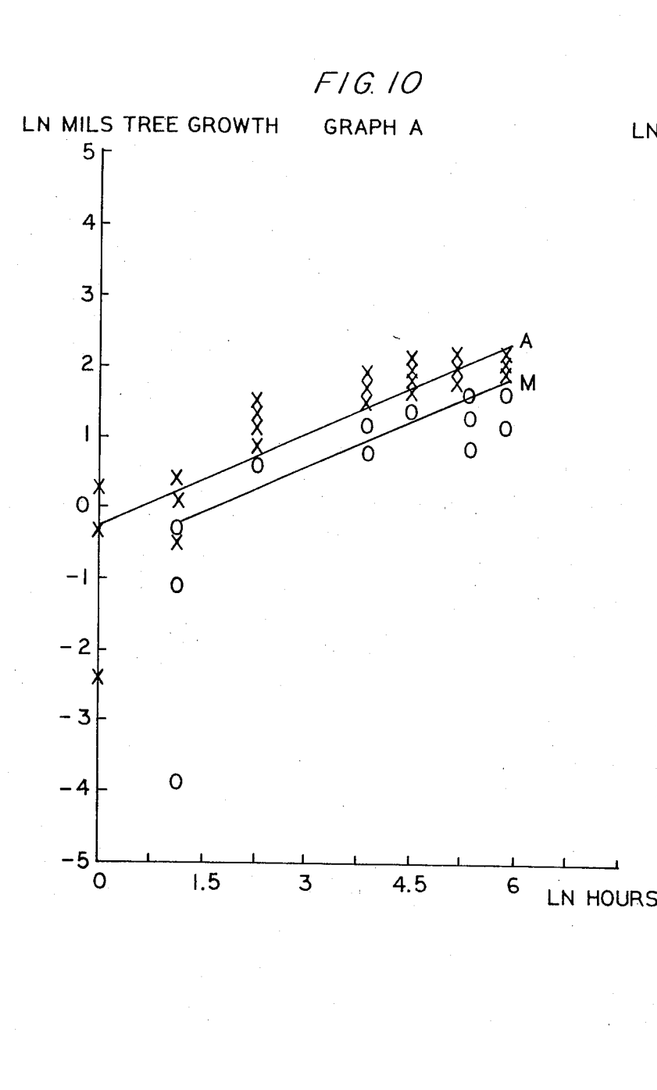
Figure 11:
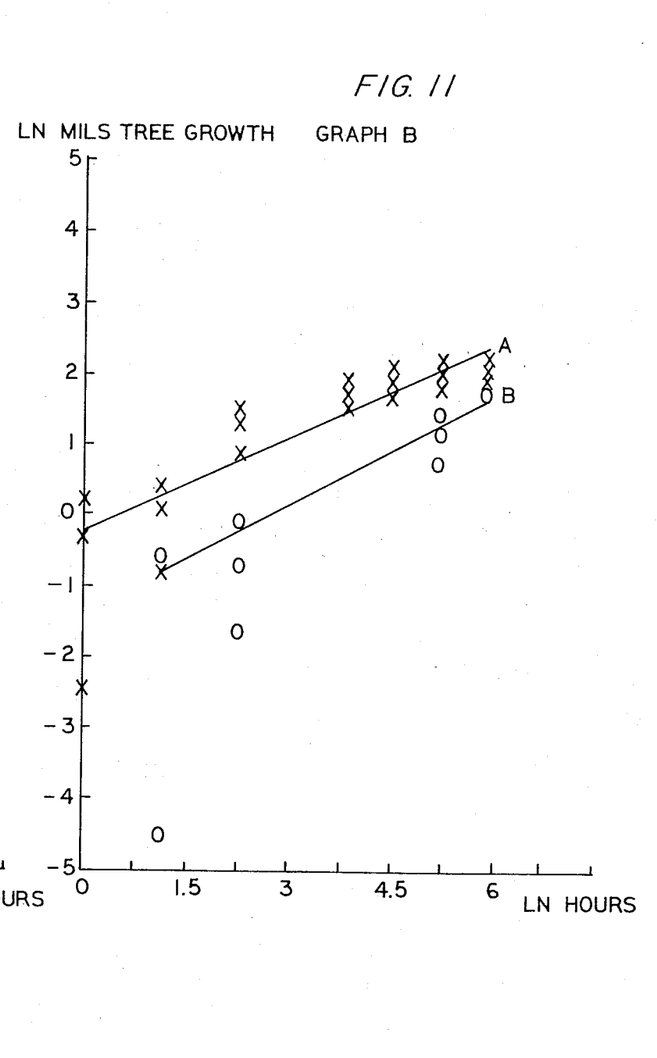
Figure 12:
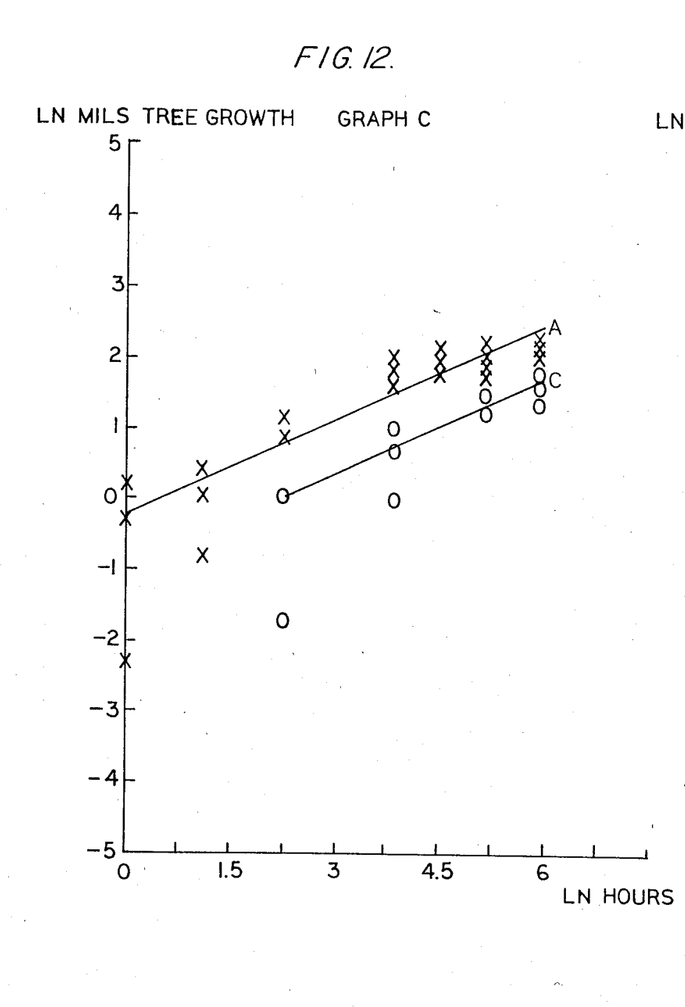
Figure 13:
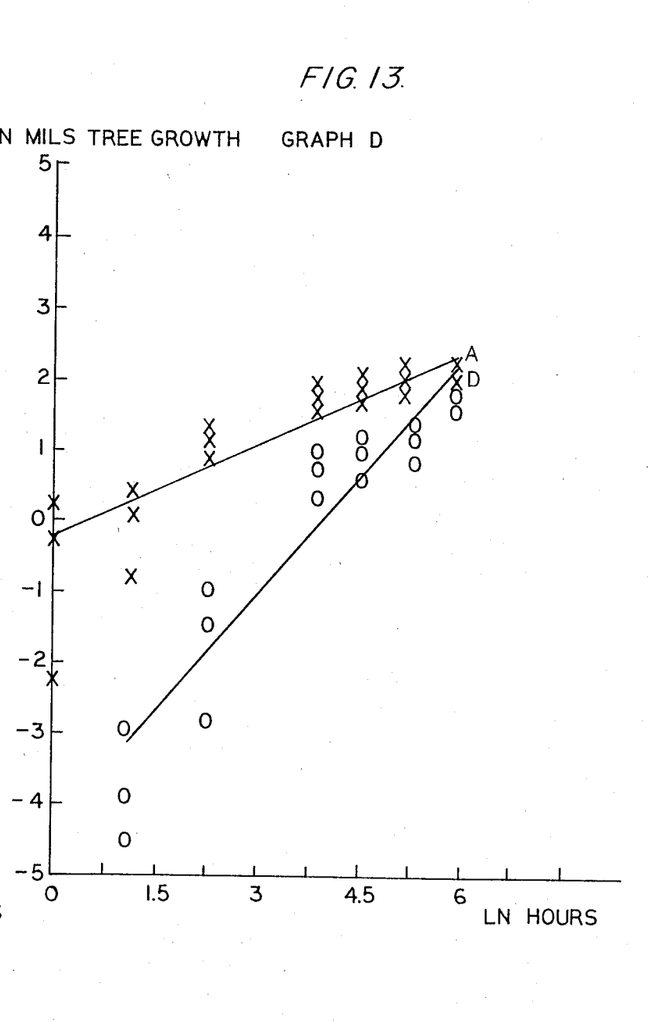
Figure 14:
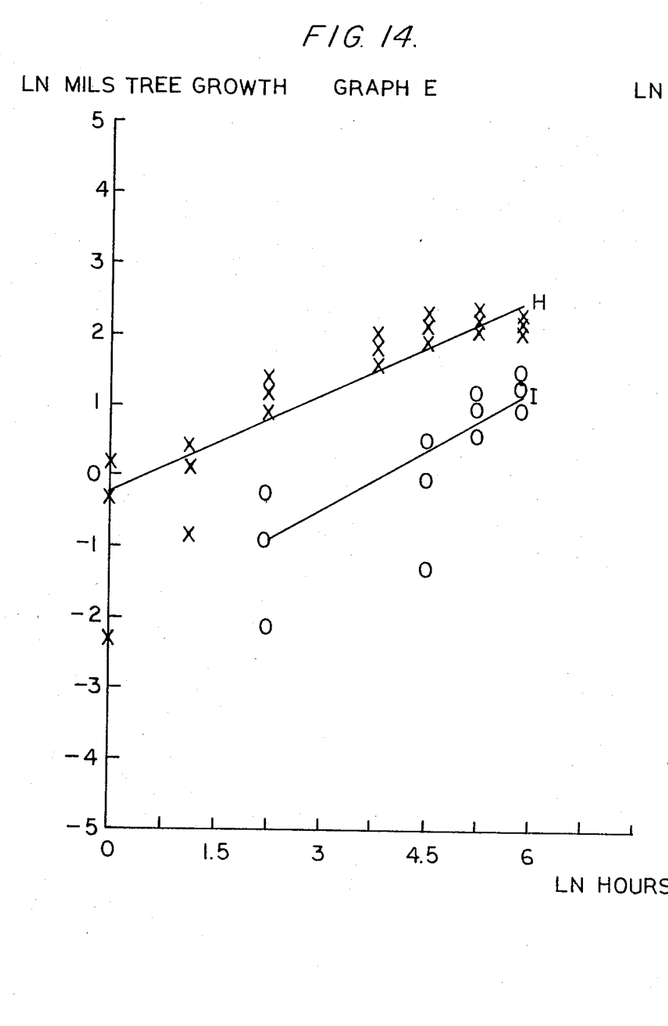
Figure 15:
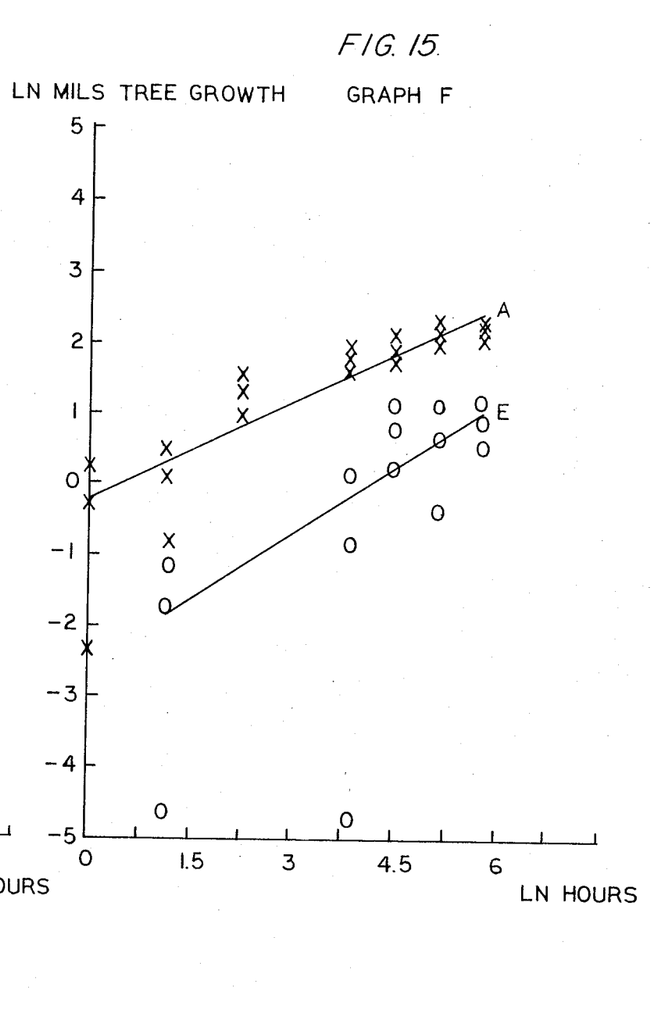
Figure 16:
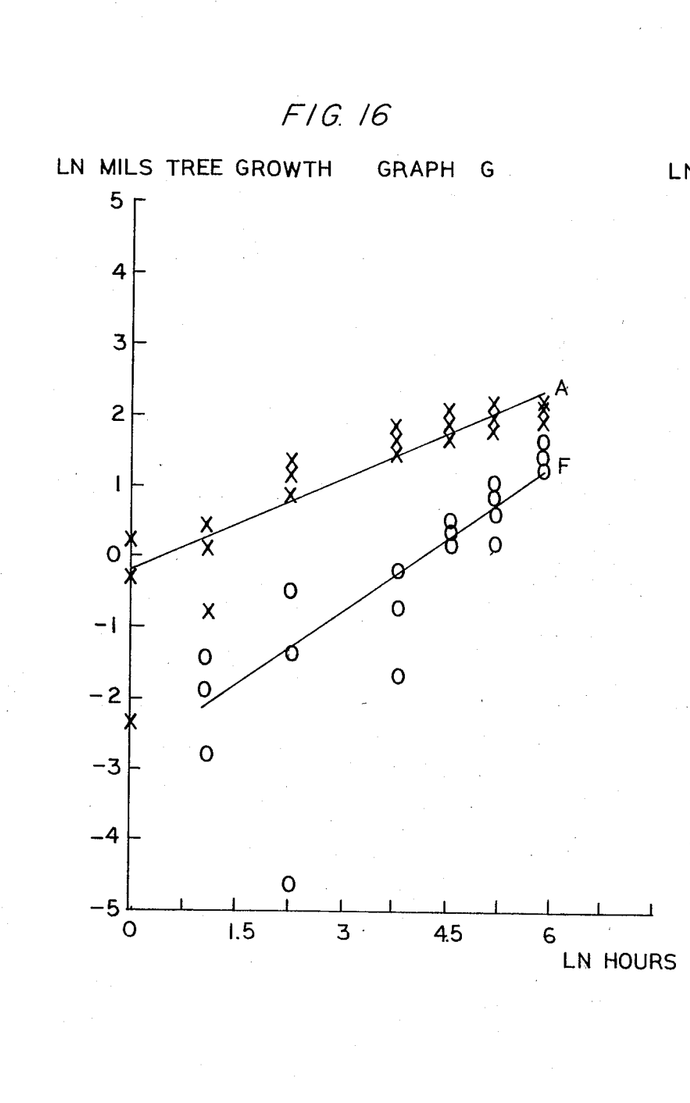
Figure 17:
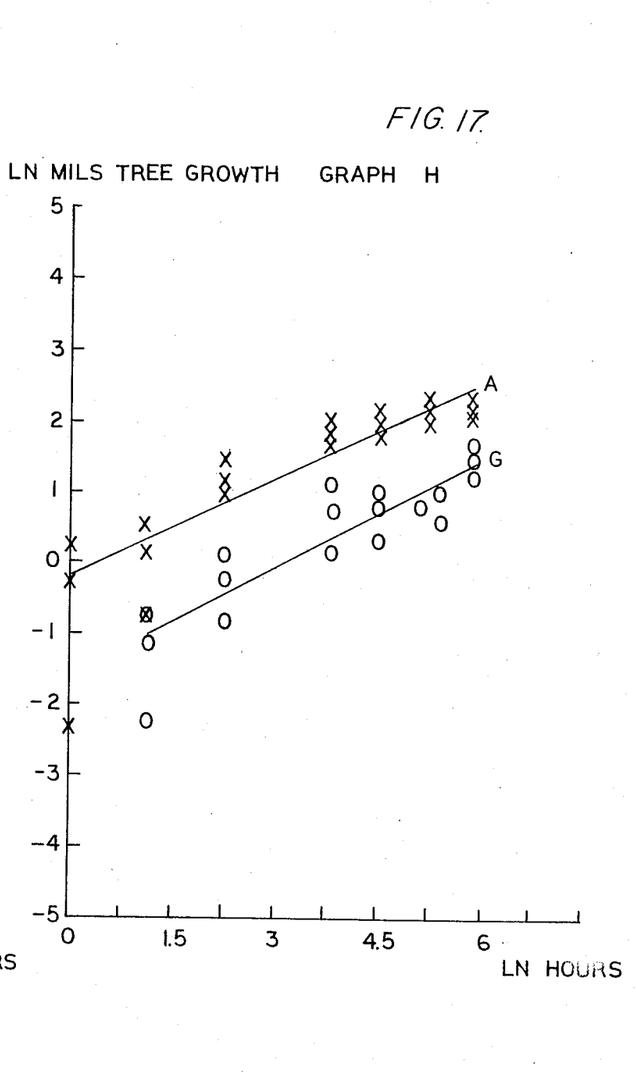
Figure 18:
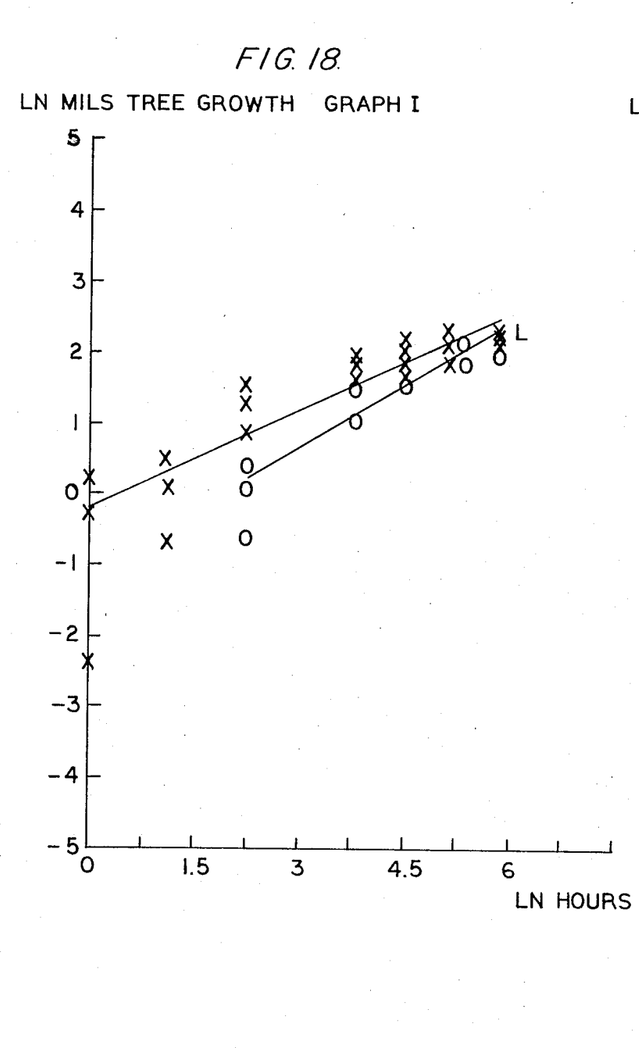
Figure 19:
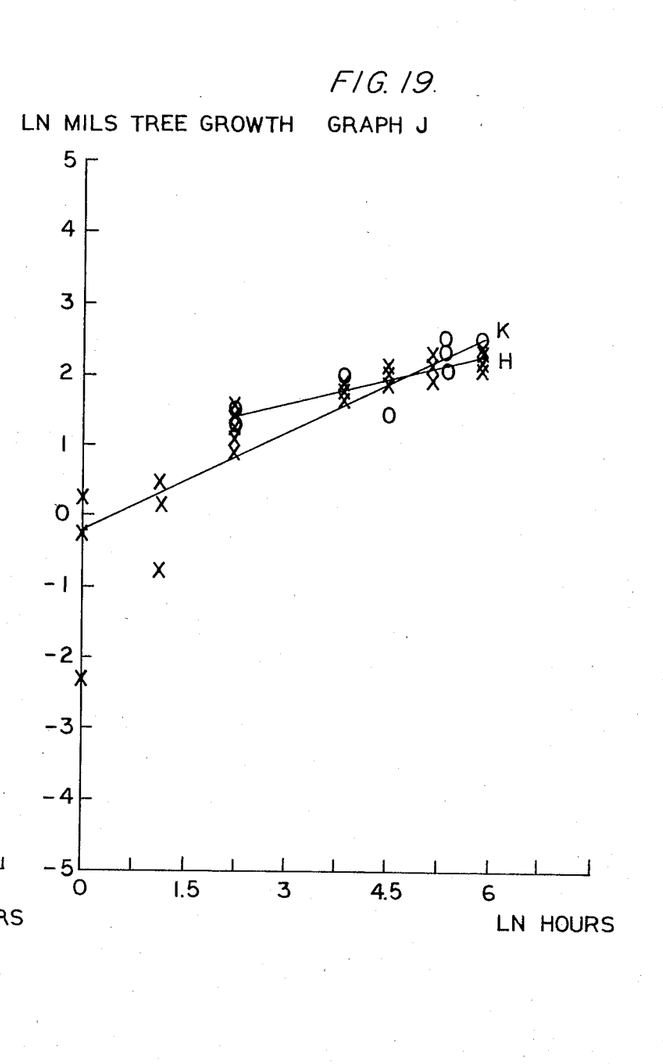

The compositions of the invention find particular utility in wire and high voltage transmission and distribution cables as the primary insulation layer to prevent treeing.

Now in order that those skilled in the art may better understand how the present invention can be practiced, the following examples are given by way of illustration and not by way of limitation. All parts and percents are by weight and all viscosities are measured at 25° C. unless otherwise specified.

EXAMPLE 1

Sample Preparation

A 1"×23" single screw Brabender extruder was used for compounding the polyethylene and the additive. A positive displacement metering pump was connected to the extruder ahead of the melt plug of plastic in the barrel. The dry plastic beads were fed into the barrel through the hopper at the rear of the extruder. Additive was simultaneously pumped into the barrel in the presence of the melted plastic. The extrudate was cooled in air and chopped into small modules.

The amount of fluid in the polyethylene was then determined by silicon analysis using atomic absorption. The analysis was performed by hardening via chilling a 10 gram sample of beads. It was then ground into a powder and 300 mg. was analyzed for silicon. The non-uniformity of the compounding process and the relatively small analytical test sample size led to at least some degree of uncertainty as to the exact amount of silicone present.

Composition A was Dow Chemical XD 60007.06 polyethylene containing no additive. The Dow Chemical XD 60007.06 polyethylene was used in the formulations for testing the following additives:

Composition B was analyzed to contain 4.86 percent by weight of a phenylmethyldimethylsiloxane copolymer containing 50 mole percent of each monomer unit and essentially no silanol.

Composition C was analyzed to contain 4.80 weight percent of a trimethylsiloxy endblocked phenylmethylsiloxane polymer containing approximately ten monomer units and essentially no silanol.

Composition D was analyzed to contain 3.67 weight percent of a trimethylsiloxy endblocked phenylmethylsiloxane fluid containing approximately three monomer units and essentially no silanol.

Composition E was analyzed to contain 4.64 percent by weight of an $\alpha,\omega$-dihydroxyphenylmethylsiloxane fluid, approximately ten monomer units in length.

Composition F was analyzed to contain 2.89 weight percent of mixed phenylmethyl, dimethylcyclosiloxanes and essentially no silanol.

Composition G was analyzed to contain less than one weight percent of 1,1,3,5,5-pentaphenyl-1,3,5-trimethyltrisiloxane.

Composition M was analyzed to contain 3.42 weight percent of a 10 mole percent phenylmethyl, 90 mole percent dimethylsiloxane fluid.

Composition H was U.S.I. polyethylene resin 31006 containing no additive. The U.S.I. polyethylene resin 31006 was used in the formulations for testing the following additives:

Composition I was analyzed to contain 6.91 percent by weight phenylmethylcyclosiloxanes.

Composition J was analyzed to contain 6.95 percent by weight of 1,1,3,5,5-pentaphenyl-1,3,5-trimethylsiloxane.

Composition K was analyzed to contain approximately 5 weight percent of mineral oil.

Composition L was Union Carbide Corporation's 6202 NT tree retardant polyethylene containing approximately 2 weight percent of a silane having the general formula formula $C_6H_5C\!=\!N(CH_2)_3Si(OCH_2CH_3)_3$.

Injection Molding of Samples

A single cavity injection mold was used and the molding temperatures were in the range of 375° to 500° F. The injection pressure ranged from 600 to 900 psi. The mold temperature ranged from 20° to 110° F. and the cycle time varied from 45 to 60 seconds.

Electrical Endurance Test

The treated plastic was injected around methylene chloride cleaned electrodes held in place by demountable electrode holders. Samples E, H, J, K, and L were injected around electrodes which were steel phonograph needles having points of 50±5 micrometers radius of curvature. Specifically, the electrode was a Dean #18 Filter Point Needle purchased from John Dean, Inc., Putnam, Conn. Samples B, C, D, I, and F were injected around precision needles with a 5.0 um radius of curvature. These precision needles were obtained from the Ogura Jewel Industry Company, Inc., Tokyo Japan. Since Sample A was used in formulations for a variety of additives, it was injected around both types of electrodes and the electrode used was dependent on the comparison additive's choice of electrode. The other electrode was a standard eighth inch steel dowel pin with one end ground to a number four grind micro surface. By adjusting the length of the electrodes protruding from the holders, an electrode spacing of 0.025 inches was established.

Following the formation of the samples by injection molding, they were x-rayed to permit identification and rejection of the ones in which the electrodes had moved during molding. Samples having approximately 0.025±0.001 inch gap were selected for testing. The x-rays were taken by placing the sample in a Plexiglas ®, trademark owned by Rohm & Haas Co., Philadelphia, Pa., holder, positioning it over a Type 51 high contrast 4×5 inch Polaroid ®, trademark owned by Polaroid Corporation, Cambridge, Massachusetts, film and then exposing the sample and film to x-rays. The pictures were then examined under a microscope. The molded sample itself was half an inch in diameter and three quarters of an inch long.

The selected specimens tested with the 50 micrometer needle were subjected to an electrical voltage of 30,000 volts. These samples were immersed in oil to prevent flashover. The specimens tested with the 5 micrometer needle were subjected to an electrical voltage of 8,000. The time to failure was recorded for each sample. Generally, 30 or more samples of each composition were required for statistical evaluation. The data were evaluated by use of the computer program described by G. C. Stone and J. F. Lawless' article entitled "The Application of Weibull Statistics to Insulation Ageing Tests", *IEEE Trans. Electr. Insul.*, EI-14, October, 1979, pp 233–239.

The data points were then graphed using a computer graphing routine. This program presented the data as individual points with a line determined by the Weibull parameters $\alpha$, $\beta$, and $\gamma$ which were derived from the data points drawn through them. In addition, 90% confidence intervals for the data were included.

The results are presented in Graphs I to IX. As can be seen by the graphs, the additives do affect the electrical treeing resistance of polyethylene to varying degrees. The data set denoted by "x's" are the comparative base resins with no additive. The data set denoted by "o's" are the base resins with the additives. The y axis of the graphs is the failure probability and ranges from 0.01 to 0.95. The x axis of the graphs is the failure time in seconds and ranges from 3 to 10,000.

This electrical tree test performed was similar to the method described in IEEE Conference Paper No. C73, 257-3, 1973 by E. J. McMahon and J. R. Perkins.

Water Treeing Test

The water treeing tests were done on injection molded samples approximately 1¼ inches high by 1 inch in diameter with an inner cavity approximately ¾ inch in diameter. The bottom of the test sample had an intentional fault with a radius of curvature of approximately 15 micrometers. This point was located approximately 0.022 inches from the outside bottom surface of the test sample. Prior to testing, the outside bottom of the sample was sprayed with conductive silver paint. The test was run in a rig which holds 10 samples. Each sample was charged with 2 ml of saturated aqueous sodium chloride solution containing a small amount of Triton X-400 surfactant, stearyl benzyl dimethyl ammonium chloride manufactured by Rohm and Haas, Philadelphia, Pa. A high voltage electrode was inserted in the salt solution in the test sample. The sample was placed in a small plastic cup containing a ground lead. A voltage of 10 kV at 3 kHz was applied to the high voltage electrode. Samples were tested in periods ranging from 3 to 400 hours. After the test, the fault was cut out of the test cell with a cork bore and placed immediately in a concentrated aqueous solution of methylene blue containing small amounts of ammonium hydroxide and Triton X-400. The sample was microtomed and the slice containing the point of fault was placed on a glass slide, flooded with the methylene blue solution, and photomicrographed. The length of the trees were measured for an entire sample set. The results of the analysis are presented graphically as a plot of the natural log average tree length versus the natural log of test time in Graphs A through J.

In all the graphs, the data for the polyethylene containing no additives are represented by "x's". There are three "x's" for each time period over which the samples were evaluated. The three "x's" are the sample mean, and the upper and lower 90 percent confidence bound for the mean. The line is the computed regression line best fitting the means. The base resin regression line extends to the tree growth axis in all cases.

The data for the polyethylene containing additives are presented as a series of "o's". There are also three "o's" for each time period over which the samples were measured. These three points are also the sample mean, and the upper and lower 90 percent confidence bounds for the means. The line is the computed regression line best fitting the means.

As can be seen by the results plotted in the graphs, the silicone additives do enhance polyethylene's resistance to water treeing to varying degrees. The water treeing test performed is similar to the procedure described in U.S. Pat. No. 4,144,202.

As indicated earlier in the specification, the length of the linear siloxanes, the silanol content of the linear siloxanes and the groups attached to the silicon atom, all contribute to the usefulness of the various siloxanes in this invention. The following table shows the results of such comparisions and shows the criticality of the silanol content. The polyethylene of sample A was XD 60007.06, manufactured by the Dow Chemical Company, Midland, Mich., U.S.A. The samples were handled the same as those set forth in the water treeing test described above. The numbers under the "testing time" column of the following table are the lengths of trees measured in mils. Samples A through G are outside the scope of this invention, and samples H, I and J are illustrative of the invention.

| Sample | Additive/Amount in Weight % | Weight Percent OH | Testing Time (hours) | | | | | | | | |
|---|---|---|---|---|---|---|---|---|---|---|---|
| | | | 3 | 10 | 30 | 50 | 100 | 136 | 200 | 300 | 400 |
| | | | Tree Length in Mils | | | | | | | | |
| A | Polyethylene | — | 1.02 | 3.38 | 2.21 | 5.73 | 7.12 | — | 7.59 | — | 8.19 |
| B | $(CH_3)_3SiO\{C_6H_5(CH_3)SiO\}_{10}Si(CH_3)_3$/4.8 | 0 | — | 1.0 | — | 1.78 | 5.15 | — | 4.49 | — | 4.79 |
| C | $(CH_3)_3SiO\{C_6H_5(CH_3)SiO\}_3Si(CH_3)_3$/3.67 | 0 | — | 0.23 | — | 0.51 | 1.39 | — | 4.01 | — | 4.39 |
| D | $\{(CH_3)_3SiO\}_2$—Si—O—Si—$\{OSi(CH_3)_3\}_2$<br>$\quad\quad\quad\quad\;\;\;\;\;\;$\|$\quad\quad$\|<br>$\quad\quad\quad\quad\;\;\;\;\;\;C_6H_5\quad C_6H_5$/2.06 | 0 | — | 0.55 | — | 0.84 | 1.28 | — | — | 3.17 | — |
| E | $(CH_3)_3SiO\{C_6H_5(CH_3)SiO\}$—$\{(CH_3)_2SiO\}Si(CH_3)_3$/4.89 | 0 | 0.62 | 0.52 | 1.07 | — | — | — | 2.96 | — | 6.42 |
| F | $HO\{(CH_3)_2SiO\}_{10}H$/2.12 | 4.4 | 1.3 | 2.88 | 2.21 | — | 6.10 | — | — | — | 5.40 |
| G | $HO\{C_6H_5(CH_3)SiO\}H$ | 0.4 | — | — | — | 6.42 | 8.71 | — | 7.50 | — | 7.52 |
| H | $HO\{C_6H_5(CH_3)SiO\}_{10}H$/2.91 | 2.46 | 0.05 | 0.11 | 1.4 | — | — | 0.42 | — | 0.75 | — |
| I | $HO\{C_6H_5(CH_3)SiO\}_{10}H$/4.69 | 2.46 | 0.16 | 0.05 | — | 0.47 | 2.09 | — | — | 1.80 | 2.31 |
| J | $\{C_6H_5(CH_3)SiO\}_{3,4,5}$/6.91 | 0 | — | 0.43 | — | 0.28 | 0.92 | — | 2.57 | — | 3.10 |

That which is claimed is:

1. A composition consisting essentially of a polyolefin and 1.0 to 5.0 weight percent, based on the total weight of the polyolefin, of an additive selected from
   (i) cyclic siloxanes containing at least one aromatic group attached to silicon through a silicon-carbon bond;
   (ii) liner siloxanes having the general formula $HO\{C_6H_5(CH_3)SiO\}_xH$ wherein x has a value of from 2 to 10,
   (iii) linear siloxanes having the general formula $RO\{C_6H_5(CH_3)SiO\}_xR$ wherein x has a value of from 2 to 36 and R is selected from a group consisting of $CH_3O-$ and 2. A composition as claimed in claim 1 wherein the additive is the cyclic siloxane $(C_6H_5(CH_3)SiO)_3$.

3. A composition as claimed in claim 1 wherein the additive is the cyclic siloxane $(C_6H_5(CH_3)SiO)_4$.

4. A composition as claimed in claim 1 wherein the additive is the cyclic siloxane $(C_6H_5(CH_3)SiO)_5$.

5. A composition as claimed in claim 1 wherein the additive is the cyclic siloxane $(C_6H_5(CH_3)SiO)_6$.

6. A composition as claimed in claim 1 wherein the additive is a linear siloxane having the general formula $CH_3O(C_6H_5(CH_3)SiO)_xCH_3$.

7. A composition as claimed in claim 1 wherein the additive is a linear siloxane having the general formula 8. An article which is an electrical cable in which the primary insulation layer is manufactured from the composition of claim 1.

9. An article which is an electrical cable in which the primary insulation layer is manufactured from the composition of claim 6.

10. An article which is an electrical cable in which the primary insulation layer is manufactured from the composition of claim 7.